G. W. MORTER.
PIPE REST.
APPLICATION FILED MAR. 8, 1911.
999,331.
Patented Aug. 1, 1911.
Fig. 1
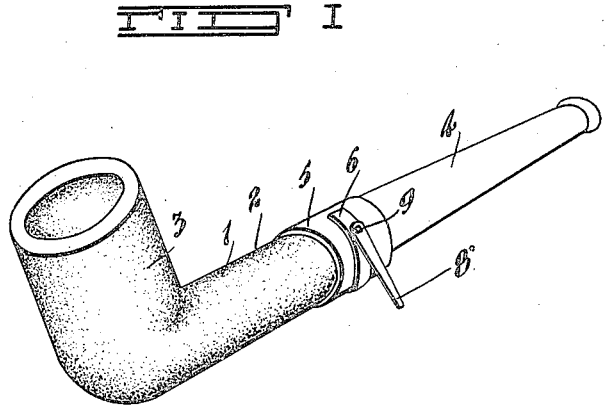
Fig. 2
Fig. 4
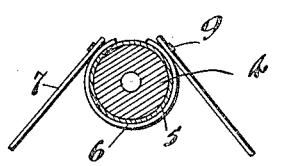
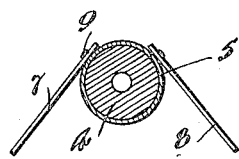
Fig. 5
Fig. 6
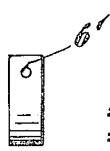
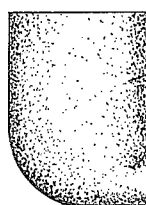
Fig. 3
Witnesses
G. Thomson
R. Foster
Inventor
G. W. Morter
By [signature] Atty

UNITED STATES PATENT OFFICE.

GEORGE WASHINGTON MORTER, OF WINNIPEG, MANITOBA, CANADA.

PIPE-REST.

999,331.  Specification of Letters Patent.   Patented Aug. 1, 1911.

Application filed March 8, 1911. Serial No. 613,123.

*To all whom it may concern:*

Be it known that I, GEORGE WASHINGTON MORTER, of the city of Winnipeg, in the Province of Manitoba, Canada, have invented certain new and useful Improvements in Pipe-Rests, of which the following is the specification.

My invention relates to pipe rests, and the object of the invention is to provide an inexpensive and durable device attachable to any pipe for holding the same with the bowl in the upright position when the pipe is laid down on a table or such like support, thereby preventing the possibility of an accidental fire or scattering of tobacco ashes as commonly occurs where pipes are put down without being emptied.

It consists essentially in a clip adapted to grasp the stem of the pipe, and legs secured to the clip, the parts being arranged and constructed as hereinafter more particularly described and later pointed out in the appended claims.

Figure 1 is a perspective view of a pipe supplied with my invention. Fig. 2 is a vertical sectional view through the clip and the pipe stem. Fig. 3 is a side elevation of a pipe supplied with my clip, the legs being folded in against the stem. Fig 4 is a second embodiment of my invention. Fig. 5 is a plan view of one of the legs. Fig. 6 is a side view of the clip.

In the drawing like characters of reference indicate corresponding parts in each figure.

1 represents a pipe of which 2 is the stem, 3 the bowl, 4 the mouth-piece, and 5 the usual ferrule located on the stem and adjoining the mouth-piece.

6 represents a spring clip of sufficient width to give it a proper bearing on the stem, which clip is placed on the pipe by slipping it over the mouth-piece and forcing it along the stem until it grasps it more or less tightly.

7 and 8 are legs pivotally secured to the clip by rivets 9, which rivets are drawn fairly tightly so that the legs will remain in whatever position they are swung to. It is to be noted that the legs have square openings 9' therein, while the clip has round openings 6', so that when the rivets, which are round, are placed in position and drawn tightly, they form square heads in the openings 9'. Consequently when the legs are swung, as later described, the rivets turn in the clip with the legs. This construction is better than simply having the legs with a round opening and turning on the rivets as they might very soon work loose and not stay where put. In the former construction, the pressure of the ferrule 5, on the inner end of the rivets, as they are forced against it by the clip, will hold the rivets, and consequently the legs, tightly in whatever position they are turned.

When the device is in use the legs are extended as shown in Fig. 1 and hold the pipe with the bowl in the upright position, the pipe resting on any supporting means with the base of the bowl and tips of the legs touching the same. When the pipe is being carried in the pocket or a case the legs are swung around against the bowl as shown in Fig. 3 of the drawing so that they are completely out of the way.

The rest, as above described, is best adapted for the pipes already manufactured, but I would suggest where pipes are being manufactured that the clip be dispensed with entirely and the legs be riveted directly to the ferrule, this modification being shown in Fig. 4 of the drawing.

Although I have shown the clip in the round form, still it will be understood that clips can be readily made to fit square or other shaped stems, all such being simply modifications of the present invention and coming under the scope of the appended claims.

What I claim as my invention is:

1. The combination with a pipe embodying the usual bowl and stem, of a removable spring clip secured to the stem, and pivoted spring legs secured to the clip, as and for the purpose specified.

2. A pipe rest comprising a metallic spring member in the form of a clip, and extending legs formed from spring material riveted to the clip, said legs being free to swing in respect to the clip, as and for the purpose specified.

3. A pipe rest comprising a metallic spring member in the form of a clip having circular openings in its ends, extending legs having square openings in their ends, and rivets securing the legs to the clip, said rivets passing through the openings and the aforesaid parts, as and for the purpose specified.

4. The combination with a pipe embodying the usual bowl and stem, of a spring clip located on the stem and pivoted legs extending from the clip as and for the purpose set forth.

5. The combination with a pipe embodying the usual bowl and stem, of a removable clip secured to the stem and pivoted legs secured to the clip, as and for the purpose set forth.

Signed at Winnipeg, in the Province of Manitoba, this 28th day of February, 1911.

GEORGE WASHINGTON MORTER.

In the presence of—
G. S. ROXBURGH,
J. K. ELKIN.